(12) United States Patent
Rune

(10) Patent No.: US 7,088,694 B1
(45) Date of Patent: Aug. 8, 2006

(54) TRANSFER OF OVERLAPPING ROUTING AREA CONTROL INFORMATION IN A RADIO ACCESS NETWORK

(75) Inventor: Göran Rune, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 791 days.

(21) Appl. No.: 09/638,858

(22) Filed: Aug. 15, 2000

Related U.S. Application Data

(63) Continuation-in-part of application No. 09/953,261, filed on Sep. 17, 2001, now Pat. No. 6,834,191, which is a continuation of application No. 09/071,886, filed on May 5, 1998, now Pat. No. 6,292,667.

(60) Provisional application No. 60/152,345, filed on Sep. 7, 1999, provisional application No. 60/153,695, filed on Sep. 14, 1999.

(51) Int. Cl.
*H04Q 7/00* (2006.01)
(52) U.S. Cl. ............... 370/331; 370/328; 455/436; 455/439
(58) Field of Classification Search ........ 370/310, 370/328, 329, 338, 349, 401, 402, 310.2, 370/331; 455/433, 435, 436, 443, 444, 445, 455/432.1, 435.1, 442, 458, 439, 456.1, 456.2, 455/438
See application file for complete search history.

(56) References Cited

U.S. PATENT DOCUMENTS 5,353,331 A * 10/1994 Emery et al. ............... 455/461

(Continued)

FOREIGN PATENT DOCUMENTS

JP     2-094829 A    4/1990

(Continued)

OTHER PUBLICATIONS

USECA, Jul. 29, 1998, D12 Overview of UMTS architecture, see figure 18, p. 41.*

*Primary Examiner*—Huy D. Vu
*Assistant Examiner*—Chuong Ho
(74) *Attorney, Agent, or Firm*—Nixon & Vanderhye, P.C.

(57) ABSTRACT

A radio access network (20) comprises plural radio network controllers (24) including a first radio network controller. The plural radio network controllers are situated to establish one or more overlapping routing areas (URAs), each overlapping routing area comprising a cell controlled by the first radio network controller and at least one cell controlled by another of the plural radio network controllers. For signaling purposes over a signaling network (30), the first radio network controller need only store network addresses for: (1) any of the plural radio network controllers which controls a cell in any overlapping routing area; and, (2) any of the plural radio network controllers which functions as a serving radio network controller for a connection for which the first radio network controller functions as a drift radio network controller. When a user equipment unit (UE) moves into an overlapping routing area (in which a second radio network controller also controls cells), the first radio network controller sends, in a signaling message to a serving radio network controller, both (1) an address of the first radio network controller, and (2) the address of the other radio network controllers controlling cells in the overlapping routing area. The information storage and signaling of the present invention thereby enable the serving radio network controller to page the user equipment unit throughout the overlapping routing area.

9 Claims, 6 Drawing Sheets

U.S. PATENT DOCUMENTS

| | | | |
|---|---|---|---|
| 5,913,167 A | 6/1999 | Bonta et al. | |
| 6,131,030 A * | 10/2000 | Schon et al. | 455/438 |
| 6,137,791 A * | 10/2000 | Frid et al. | 370/352 |
| 6,215,776 B1 * | 4/2001 | Chao | 370/316 |
| 6,216,004 B1 * | 4/2001 | Tiedemann et al. | 455/442 |
| 6,292,667 B1 * | 9/2001 | Wallentin et al. | 455/458 |
| 6,397,065 B1 * | 5/2002 | Huusko et al. | 455/435.2 |
| 6,404,754 B1 * | 6/2002 | Lim | 370/338 |
| 6,438,370 B1 * | 8/2002 | Einola et al. | 455/422.1 |
| 6,473,413 B1 * | 10/2002 | Chiou et al. | 370/331 |
| 6,834,191 B1 * | 12/2004 | Wallentin et al. | 455/442 |
| 6,879,832 B1 * | 4/2005 | Palm et al. | 455/445 |
| 6,968,192 B1 * | 11/2005 | Longoni | 455/453 |

FOREIGN PATENT DOCUMENTS

| | | |
|---|---|---|
| WO | 96/26620 | 8/1996 |
| WO | 98/32303 | 7/1998 |
| WO | 98/59505 | 12/1998 |
| WO | 99/45736 | 9/1999 |

* cited by examiner ered by way of example in the accompanying drawings in which reference characters refer to the same parts throughout the various views. The drawings are not necessarily to scale, emphasis instead being placed upon illustrating the principles of the invention.

TRANSFER OF OVERLAPPING ROUTING AREA CONTROL INFORMATION IN A RADIO ACCESS NETWORK

This application claims the benefit and priority of the following United States Provisional Patent Applications, all of which are incorporated herein by reference: U.S. Provisional Patent Application Ser. No. 60/152,345 filed Sep. 7, 1999; and U.S. Provisional Patent Application Ser. No. 60/153,695 filed Sep. 14, 1999. This application is a continuation-in-part of United States Patent Application 09/953, 261, filed Sep. 17, 2001, now U.S. Pat. No. 6,834,191, which in turn is a continuation of U.S. patent application Ser. No. 09/071,886, filed May 5, 1998, now U.S. Pat. No. 6,292,667.

BACKGROUND

1. Field of the Invention

The present invention relates to cellular radio communication networks, and particularly the handover of mobile user equipment units (UEs) from one routing area to another.

2. Related Art and Other Considerations

Cellular telecommunications systems employ a wireless link (e.g., air interface) between a (mobile) user equipment unit (UE) and a base station (BS) node. The base station node has transmitters and receivers for radio connections with numerous user equipment units. One or more base station nodes are connected (e.g., by landlines or microwave) and managed by a radio network controller node (also known in some networks as a base station controller [BSC]). The radio network controller node is, in turn, connected through control nodes to a core communications network. Control nodes can take various forms, depending on the types of services or networks to which the control nodes are connected. For connection to connection-oriented, switched circuit networks such as PSTN and/or ISDN, the control node can be a mobile switching center (MSC). For connecting to packet switching data services such as the Internet (for example), the control node can be a gateway data support node through which connection is made to the wired data networks, and perhaps one or more serving nodes.

A radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system. The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks).

Cellular radio communication systems use a functionality called handover to continue established calls when the mobile user equipment unit moves between different cells in the radio access network. The concept of handover is discussed, at least in part, e.g., in U.S. patent application Ser. No. 09/035,821 for "Telecommunications Inter-Exchange Measurement Transfer," and U.S. patent application Ser. No. 09/035,788 for "Telecommunications Inter-Exchange Congestion Control," both of which are incorporated herein by reference.

In order to support low activity UEs with a low utilization of the radio resources, a concept of UTRAN routing area (URA) and routing area update (URA update) has been introduced in UMTS. A UTRAN routing area (URA) is a geographical area comprising one or more cells. Each URA is identified by a unique identifier, which is broadcast in all cells belonging to the URA. A URA can comprise cells controlled by more than one radio network controller (RNC). In this regard, a URA with cells in more than one radio network controller (RNC) is referred to as an overlapping URA.

User equipment units that are having low activity (no user data transfer) at the moment may switch to a "URA Connected" state. When in "URA Connected" state the user equipment unit will only report change in its location when moving from one URA to another. The present invention is intended for, but not limited to, cellular networks, where the existence of URAs or equivalent allows the user equipment unit to remain "connected" with the network in a low activity state utilizing a minimum of radio interface resources.

BRIEF SUMMARY OF THE INVENTION

A radio access network comprises plural radio network controllers including a first radio network controller. The plural radio network controllers are situated to establish one or more overlapping routing areas, each overlapping routing area comprising a cell controlled by the first radio network controller and at least one cell controlled by another of the plural radio network controllers. For signaling purposes, the first radio network controller need only store network addresses for: (1) any of the plural radio network controllers which controls a cell in any overlapping routing area; and, (2) any of the plural radio network controllers which functions as a serving radio network controller for a connection for which the first radio network controller functions as a drift radio network controller.

When a user equipment unit moves into an overlapping routing area (in which a second radio network controller also controls cells), the first radio network controller sends, in a signaling message to a serving radio network controller, both (1) an address of the first radio network controller, and (2) the address of the other radio network controllers controlling cells in the overlapping routing area. The information storage and signaling of the present invention thereby enable the serving radio network controller to page the user equipment unit throughout the overlapping routing area.

BRIEF DESCRIPTION OF THE DRAWING

The foregoing and other objects, features, and advantages of the invention will be apparent from the following more particular description of preferred embodiments as illus

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
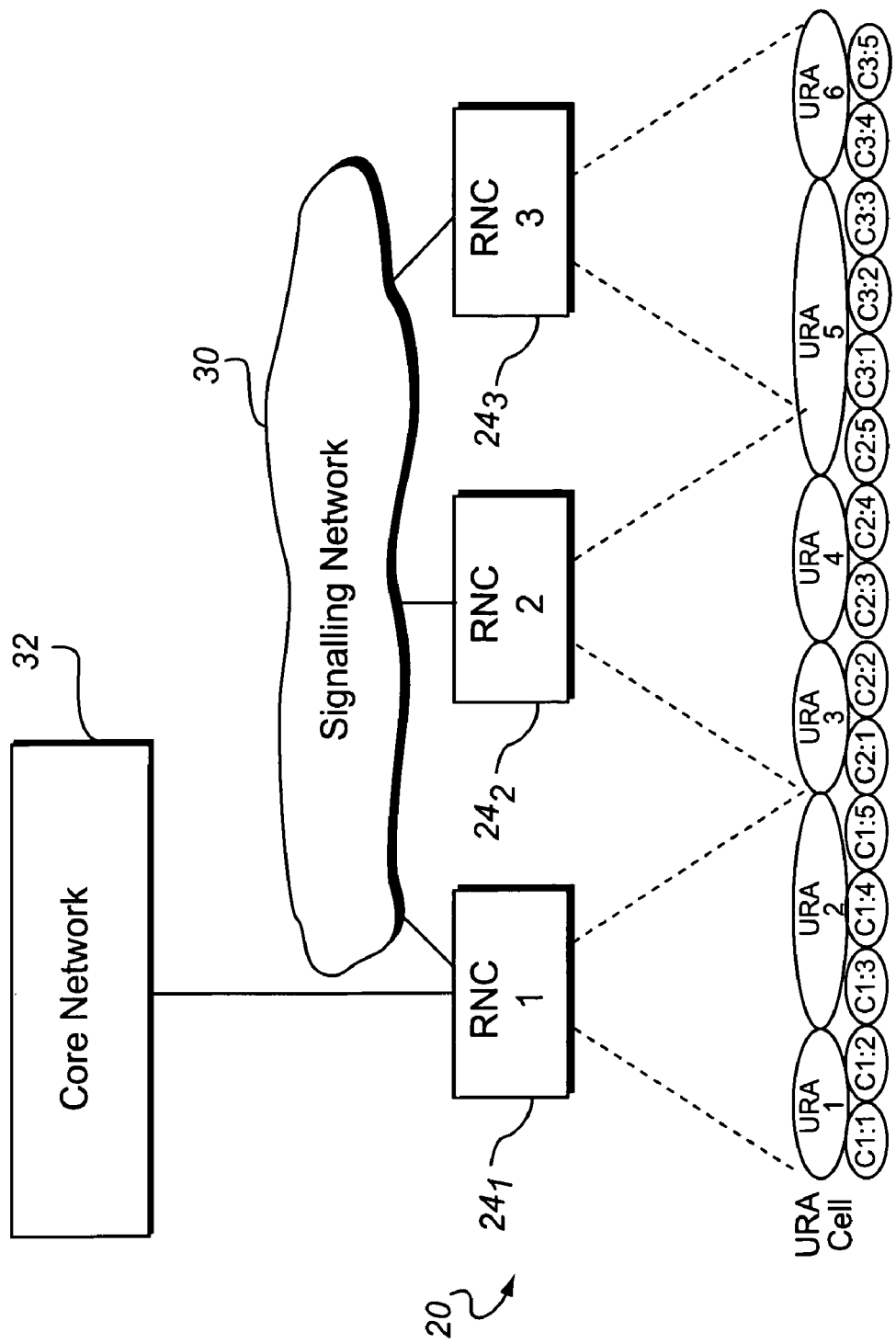
- FIG. 1 is a schematic view of a basic radio access network.

FIG. 1 shows basic architecture of typical radio access network 20. The radio access network 20 comprises plural radio network controllers (RNCs) 24, of which three illustrative RNCs are shown in FIG. 1, particularly RNC 24$_1$— RNC 24$_3$. The radio network controllers (RNCs) 24 control radio resources and radio connectivity within a set of cells. Each radio network controller (RNC) 24 is connected to and controls one or more base stations, with each base station typically serving one or more cells. In this regard, the radio network controllers (RNCs) 24 are often referred to as "base station controllers" or BSC nodes.

Although base stations per se are not shown in FIG. 1, the cells served thereby are illustrated. A cell is a geographical area where radio coverage is provided by radio base station equipment at the base station site. Each cell is identified by a unique identity, which is broadcast in the cell. As an illustration, FIG. 1 shows that radio network controller (RNC) 24$_1$ controls cells $C_{1:1}$ through $C_{1:5}$; radio network controller (RNC) 24$_2$ controls cells $C_{2:1}$ through $C_{2:5}$; radio network controller (RNC) 24$_2$ controls cells $C_{2:1}$ through $C_{2:5}$; radio network controller (RNC) 24$_3$ controls cells $C_{3:1}$ through $C_{3:5}$. In the cell notation, the first subscript corresponds to the subscript of the particular radio network controller (RNC) 24 which controls the cell, the second subscript serializes the cells controlled by the radio network controller (RNC) 24.

In radio access network 20, plural routing areas (e.g., UTRAN routing areas) are defined, particularly example routing areas $URA_1$ through $URA_6$. As mentioned above, a routing area (URA) is a geographical area comprising one or more cells. For example, $URA_1$ comprises cells $C_{1:1}$ and $C_{1:2}$; $URA_2$ comprises cells $C_{1:3}$, $C_{1:4}$, and $C_{1:5}$; and so forth. Each URA is identified by a unique identifier, which is broadcast in all cells belonging to the URA. A URA can comprise cells controlled by more than one radio network controller (RNC). For example, $URA_5$ comprises cells $C_{2:5}$, $C_{3:1}$, $C_{3:2}$, and $C_{3:3}$, of which cell $C_{2:5}$ is controlled by radio network controller (RNC) 24$_2$ while cells $C_{3:1}$, $C_{3:2}$, and $C_{3:3}$ are controlled by radio network controller (RNC) 24$_3$. Thus, $URA_5$ is an example of an overlapping URA.

FIG. 1 further shows that each radio network controller (RNC) 24 is connected to a signaling network 30. The signaling network 30 enables signaling between radio network controllers (RNCs) 24, e.g., to support continuation of established connections when a user equipment unit (UE) is moving between cells controlled by different RNCs in radio access network 20. The signaling network 30 can be, for example, a Signaling Network (e.g. Signaling System No. 7).

Each radio network controller (RNC) 24 is connected to a core network (CN) 32. Although in FIG. 1, for simplicity, only radio network controller (RNC) 24$_1$ has an interface to core network (CN) 32, it should be understood that radio network controller (RNC) 24$_2$ and radio network controller (RNC) 24$_3$ might also have an interface with core network (CN) 32. The core network (CN) 32 typically comprises multiple nodes. The radio network controllers (RNCs) 24 can all be connected to the same core network (CN) node, or alternatively the radio network controllers (RNCs) 24 can be connected to differing core network nodes.

The user equipment unit (UE) is the mobile terminal by which a subscriber can access services offered by the operator's Core Network (CN), i.e., core network (CN) 32. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

On a per CN-UE connection basis, a particular radio network controller (RNC) 24 can either be a Serving RNC (SRNC) or a Drift RNC (DRNC). A SRNC (Serving RNC) is in charge of the connection with the UE, i.e. it has full control of this connection inside radio access network 20. The SRNC is connected to core network (CN) 32. The DRNC (Drift RNC), on the other hand, supports the SRNC with radio resources for a connection with the UE that needs radio resources in cells controlled by the DRNC.

The radio access network 20 decides the role of a radio network controller (RNC) 24, i.e., whether it is to be a SRNC or DRNC, when the UE-CN connection is being established. Normally, the radio network controller (RNC) 24 that controls the cell where the connection to the UE is initially established is assigned the SRNC role for this UE connection. As the UE moves, the connection is maintained by establishing radio communication branches via new cells, possibly also involving cells controlled by other RNCs (DRNCs).

The above described roles are relevant also when a UE is in a low activity state (URA Connected) and only reporting its change of location on a URA basis (rather than on a cell basis). The control of UEs in low activity state remains in the SRNC. Each radio network controller (RNC) can act or function as a serving RNC (SRNC) for one UE, and on the other hand at the same time act or function as a drift RNC (DRNC) for another UE.

Figure 2:
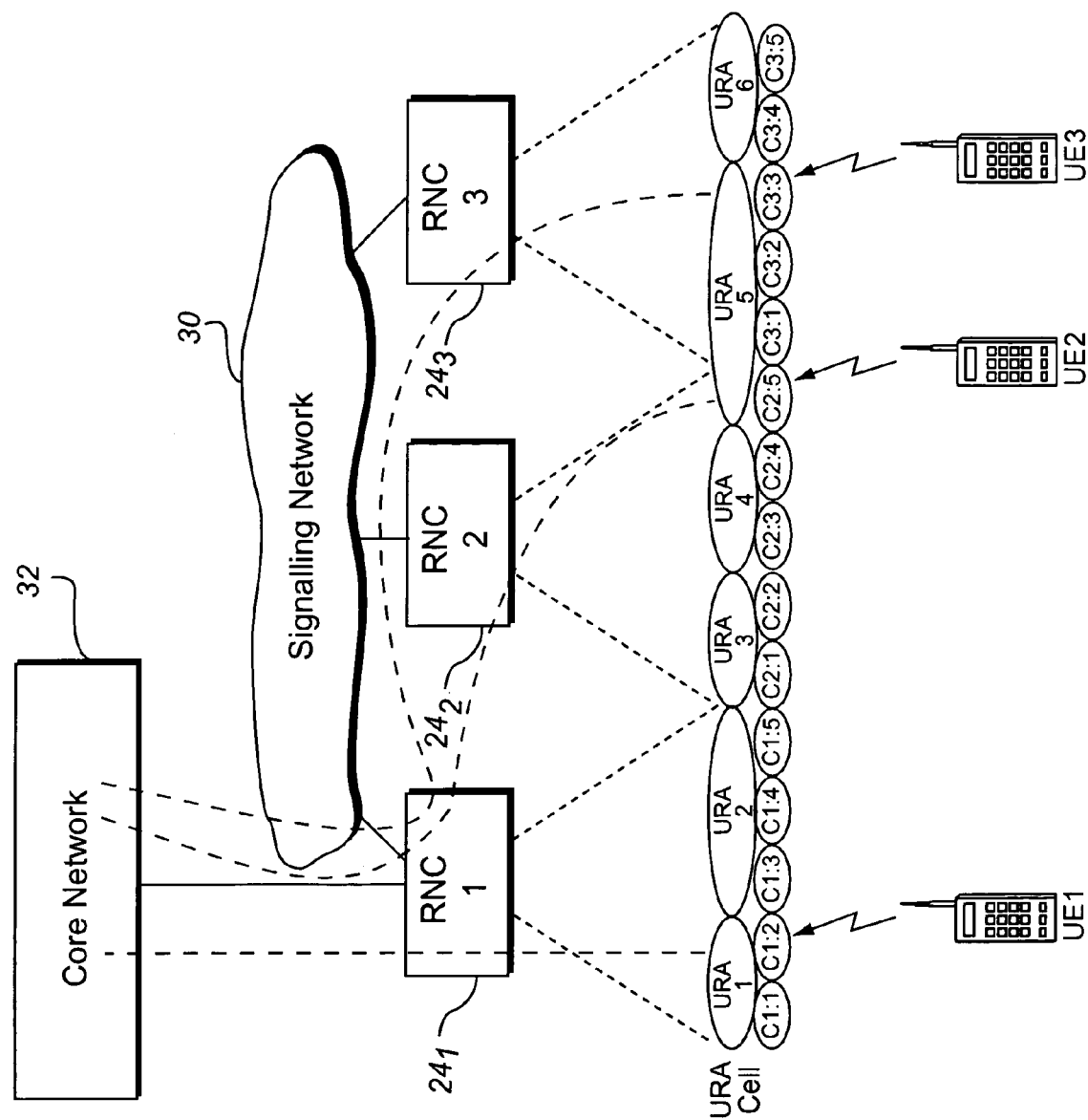
FIG. 2 is a schematic view of the basic radio access network, and showing three user equipment units (UEs) at a particular moment in time.

In FIG. 2, radio network controller (RNC) $24_1$ acts as SRNC for the connections to UE1, UE2 and UE3. The connection to UE2 is, after successive URA updates, communicated via a URA (and cell) controlled by RNC $24_2$, thus acting as DRNC for this connection. The connection to UE3 is, after successive URA updates, now communicated via a URA (and cell) controlled by RNC $24_3$, thus acting as DRNC for this connection.

When in "URA Connected" state as mentioned above, the UE will only report change in its location when moving from one URA to another. This is done by performing a procedure called URA Update. The flashes with arrowheads in FIG. 2 depict the Ues initiating a URA Update. The UE stays in "URA Connected" mode also after a URA Update is performed, i.e. the next contact with the network is when a new URA boarder is passed (e.g., when the UE moves from the current URA into a new URA).

Figure 3:
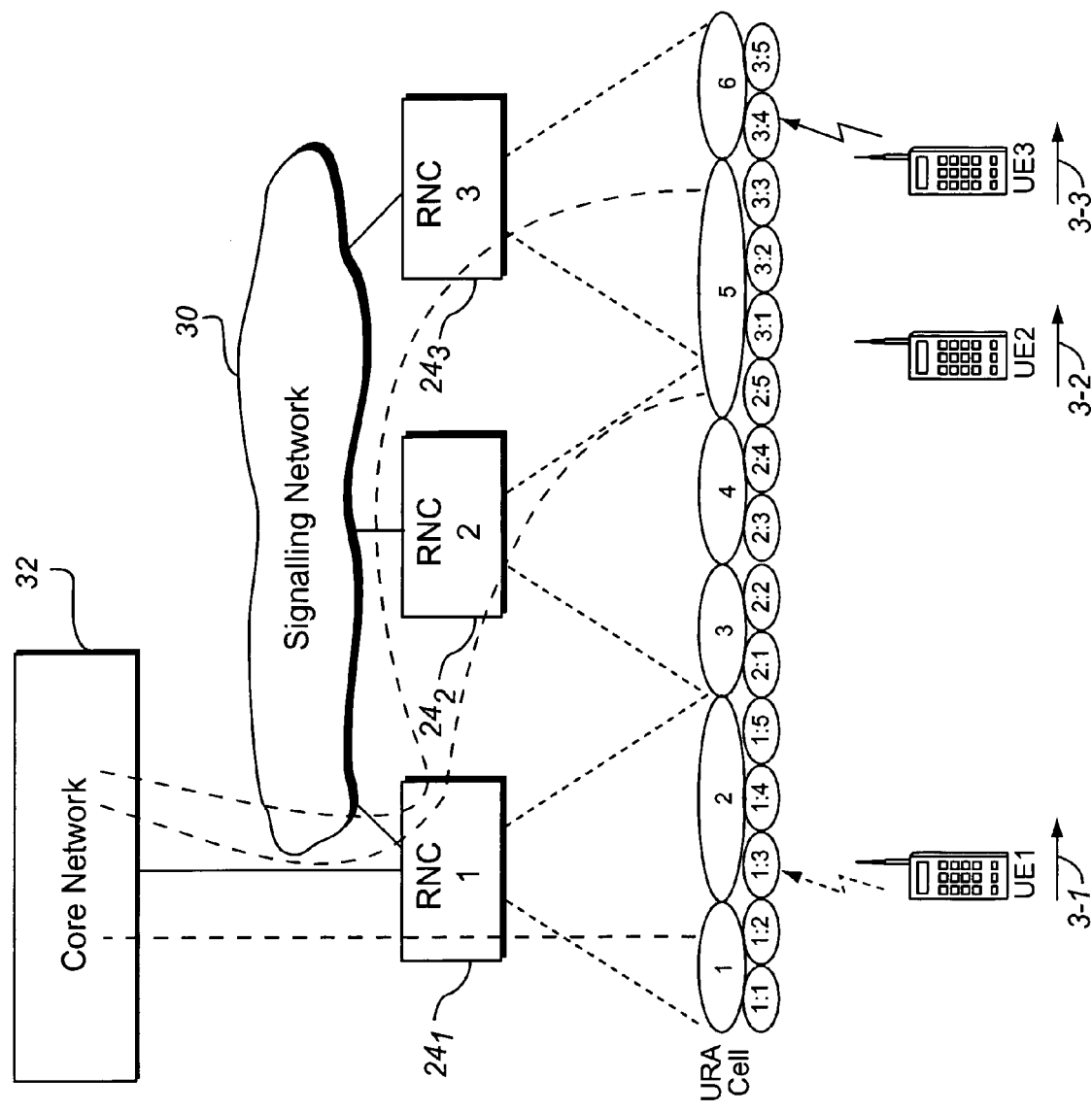
FIG. 3 is a schematic view of the basic radio access network, and showing three user equipment units (UEs) at a moment in time subsequent to that of FIG. 2.

FIG. 3 shows various URA Update activities. First, FIG. 3 shows UE1 performing a URA Update when moving from $URA_1$ to $URA_2$ (the movement depicted by arrow 3-1). Second, FIG. 3 shows that UE2 does not perform an URA Update despite moving (as indicated by arrow 3-2) from a cell controlled by radio network controller (RNC) $24_2$ to a cell controlled by radio network controller (RNC) $24_3$, both cells being within $URA_5$. In this regard, note that in FIG. 3 UE2 does not have an arrowhead flash. $URA_5$, as mentioned above, is an overlapping URA. In this case, the SRNC (i.e., radio network controller (RNC) $24_1$) is unaware that UE2 cannot be reached via radio network controller (RNC) 242. Third, FIG. 3 shows that UE3 performs a URA Update when moving (as indicated by arrow 3-3) from $URA_5$ to $URA_6$.

Figure 4:
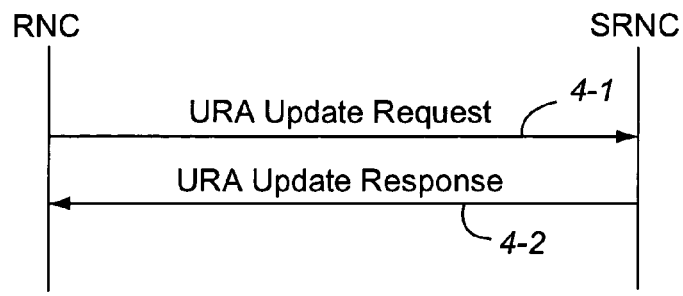
FIG. 4 is a diagrammatic view of messages transmitted between a radio network controller (RNC) and a Serving Radio Network Controller (SRNC) for the scenario of FIG. 3.

When the UE3 in FIG. 3 performs an URA Update, this is conveyed to the SRNC for UE3, i.e. radio network controller (RNC) $24_1$. The procedure to convey the URA Update to the SRNC is shown in FIG. 4. FIG. 4 shows the radio network controller (RNC) $24_3$ sending a URA Update Request message 4-1 to the SRNC (i.e., radio network controller (RNC) $24_1$), and (in response) the SRNC returning a URA Update Response message 4-2. Thus, FIG. 4 shows an RNC—RNC signaling procedure to support URA Update from another RNC (the DRNC) where the connection with the network was established by the SRNC.

Conventionally, as in GPRS for example, sharp routing area boarders between base station controllers (RNCs) are defined in order to support low activity mobility in large radio access networks, and not allowing routing areas to overlap between the BSCs. However, it is presently contemplated that in the future routing areas may overlap between different RNCs. In accordance with present proposals in this regard, it is required first that each RNC store, on a permanent basis, the signaling network address of all RNCs in the radio access network (UTRAN). As a second requirement of such proposal, the signaling network addresses must be correlated with the URA configuration of the radio access network (UTRAN). These requirements are considered necessary in terms of the proposals in order to be able to page a UE within any URA in the radio access network.

However, the foregoing proposal implies that a RNC needs to store information concerning the configuration of the full radio access network with regards to URAs and which RNCs has at least one cell within a particular URA. As such, the proposal unfortunately requires extensive configuration information in each RNC, which of course implies extensive updating task as the radio access network evolves.

The drawbacks of the foregoing proposal are overcome by the present invention. In accordance with the storage of information at an RNC, the present invention requires that an RNC need, on a permanent basis, only store for all its URAs the RNC signaling network address of (1) all other RNCs that have at least one cell in that URA; and (2) any RNCs which function as a serving RNC for a connection for which the RNC functions as a drift RNC (DRNC). Further, in accordance with signaling aspects of the present invention, the RNC signaling network address (or abstract identifies representing the signaling network addresses) of all the RNCs having at least one cell in the same URA as from which the URA Update was received are transferred in signaling messages between the involved RNCs when needed.

Thus, regarding RNC address storing for the present invention, on a permanent basis an RNC need only store, for all its URAs, the RNC signaling network address of all other RNCs that have at least one cell in that URA. Of course, the RNC needs also to store the signaling address of an SRNC for a connection for which the RNC acts as a drift RNC (DRNC) in order to be able to pass the URA Update to the SRNC when receiving an URA Update from the UE participating in the connection.

In the situation in FIG. 2, for example, utilization of the present invention has three implications. The first implication is that radio network controller (RNC) $24_2$ stores the signaling network address of radio network controller (RNC) $24_3$, since radio network controller (RNC) $24_2$ needs the address of radio network controller (RNC) $24_3$ since $URA_5$ has cells also in radio network controller (RNC) $24_3$). However, radio network controller (RNC) $24_2$ does not need to store the signaling network address of radio network controller (RNC) $24_1$ (since none of the URAs within radio network controller (RNC) $24_2$ has cells in radio network controller (RNC) $24_1$). A second implication is that radio network controller (RNC) $24_3$ stores the signaling network address of radio network controller (RNC) $24_2$ (radio network controller (RNC) $24_3$ needs this since the URA5 has cells also in radio network controller (RNC) $24_2$). As a third implication, radio network controller (RNC) $24_1$ does not need to store the signaling network address of any other RNC (the URAs 1 and 2 exists only in radio network controller (RNC) $24_1$).

Regarding signaling aspects of the present invention, the RNC signaling network address (or abstract identifies representing the signaling network addresses) of all the RNCs having at least one cell in the same URA as from which the URA Update was received are transferred in signaling messages between the involved RNCs when needed. This enables support paging of a mobile in any URA where the mobile has performed a URA Update, regardless of which RNCs that have cells in that URA. This requires that the RNC signaling network address (or abstract identifies representing the signaling network addresses) of all the RNCs having at least one cell in the same URA as from which the URA Update was received in are transferred in signaling messages between the involved RNCs when needed. One appropriate event for this is the signaling procedure that the DRNC receives a URA Update request message from the mobile and forwards this message to the SRNC.

Figure 6:
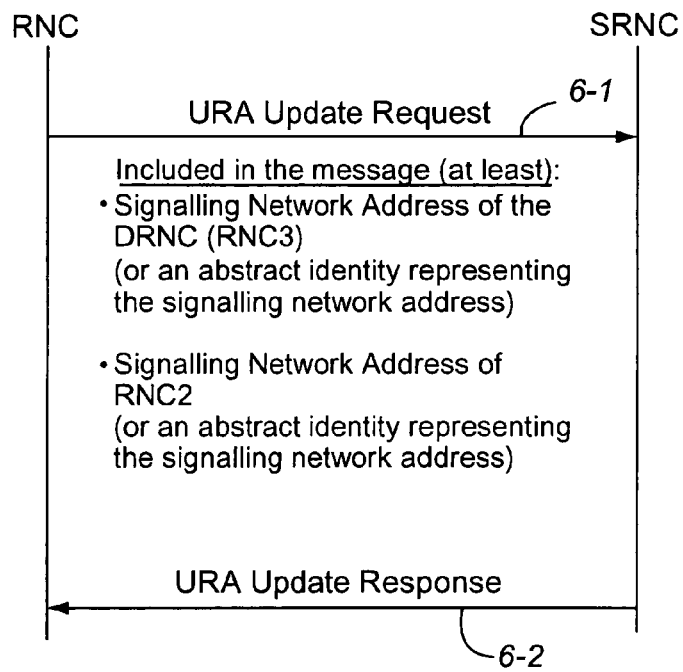
FIG. 6 is a diagrammatic view of an RNC—RNC signaling procedure to support the URA Update of the invention in the scenario of FIG. 5.
Figure 5:
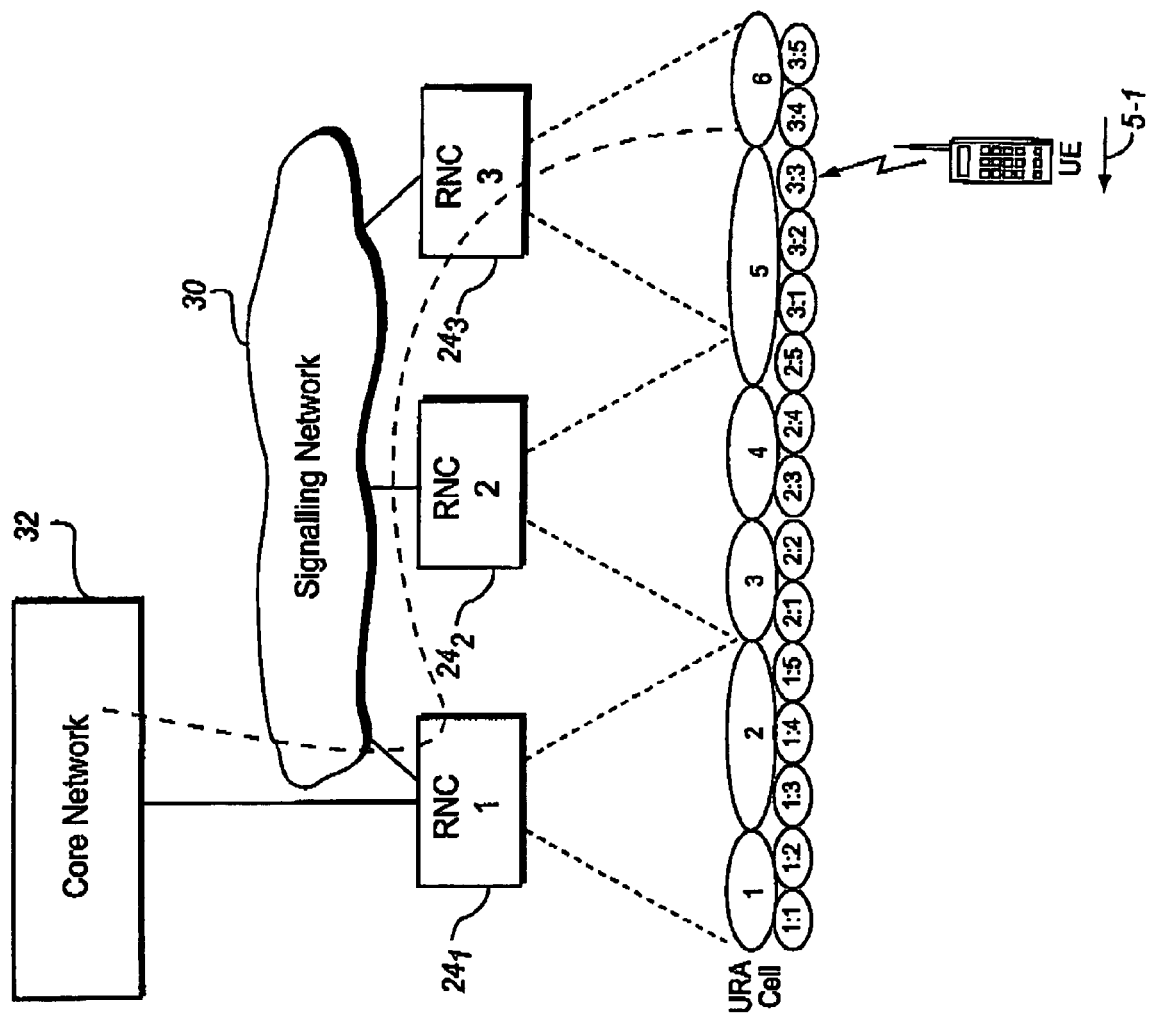
FIG. 5 is a schematic view of the basic radio access network, and showing a first example scenario in which a user equipment unit (UE) makes a URA Update in accordance with the present invention.

FIG. 5 shows a situation in which a UE is moving from $URA_6$ to $URA_5$ (as indicated by arrow 5-1), necessitating a URA Update. FIG. 6 shows a sequence of messaging for the scenario of FIG. 5, including both a URA Update Request message 61 sent from the DRNC (radio network controller (RNC) $24_3$) to the SRNC (radio network controller (RNC) $24_1$), and a URA Update Response message 6-2 sent from radio network controller (RNC) $24_1$ to radio network controller (RNC) $24_3$. In the sequence in FIG. 6, the DRNC sends to the SRNC, as URA Update Request message 61, the following information: (1) its own signaling network address (or an abstract identity representing the signaling network address); and (2) the signaling network address (or an abstract identity representing the signaling network address) of radio network controller (RNC) $24_2$. The transmission of the signaling network address of radio network controller (RNC) $24_2$ is necessary since the UE is now in a URA that includes cells in both radio network controller (RNC) $24_3$ and radio network controller (RNC) $24_2$. Upon receipt of the information of URA Update Request message 6-2, the SRNC can (if needed) page the UE within the entirety of $URA_5$, including cell $C_{2:5}$ controlled by radio network controller (RNC) $24_2$.

Figure 8:
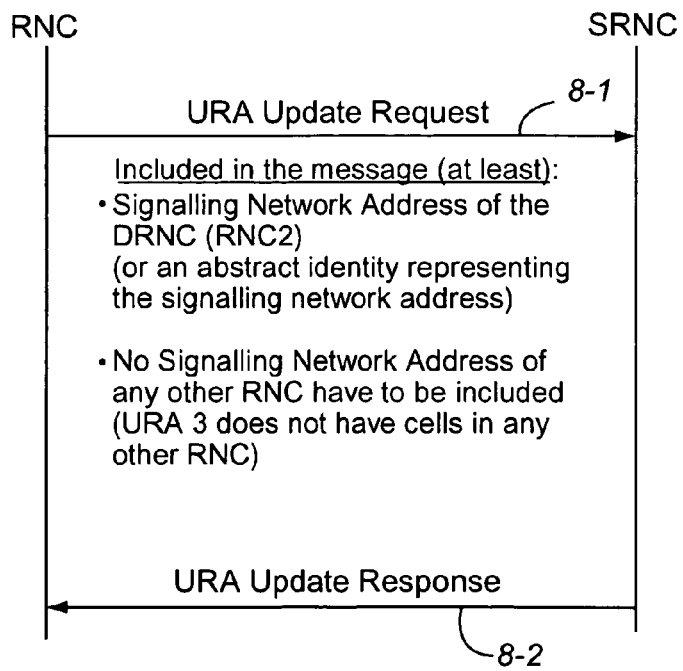
FIG. 8 is a diagrammatic view of an RNC—RNC signaling procedure to support the URA Update of the invention in the scenario of FIG. 7.
Figure 7:
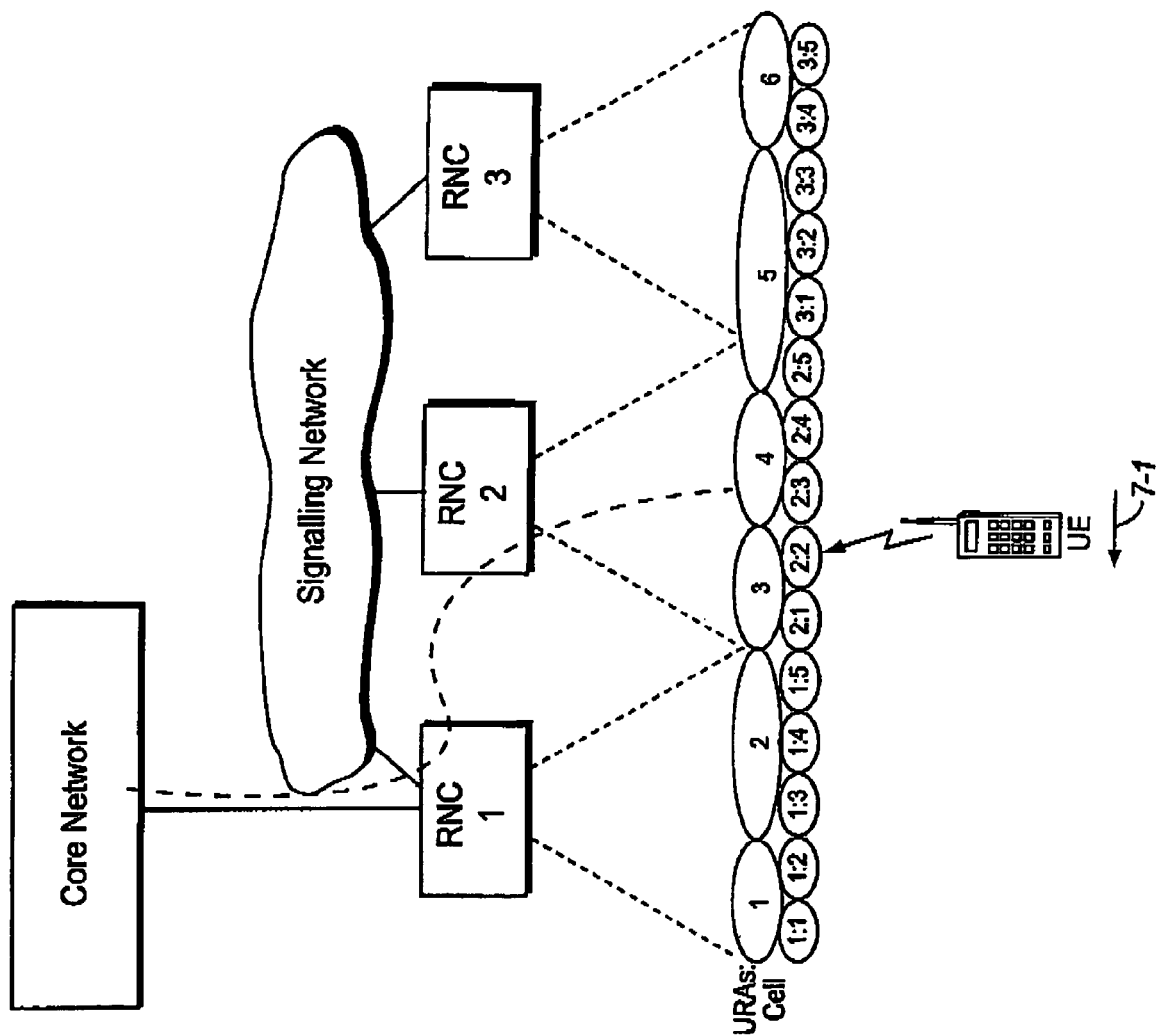
FIG. 7 is a schematic view of the basic radio access network, and showing a second example scenario in which a user equipment unit (UE) makes a URA Update in accordance with the present invention.

In the scenario of FIG. 7, the UE is moving from $URA_4$ to $URA_3$ (as indicated by arrow 7-1) and will thus perform a URA Update. In the messaging sequence in FIG. 8, in the URA Update Request message 8-1 the DRNC (i.e., radio network controller (RNC) 242) does not send the signaling network address (or an abstract identity representing the signaling network address) of any other RNC to the SRNC, since the $URA_3$ into which the UE moved does not have cells in any other RNC. However, in the URA Update Request message 8-1 the DRNC still sends its own signaling network address (or an abstract identity representing the signaling network address) to the SRNC (i.e., radio network controller (RNC) $24_1$). As a result of the procedure, the SRNC can page (if needed) the UE within the entire of $URA_3$ (fully within radio network controller (RNC) $24_2$).

One example way of determining how an RNC which receives a URA Update Request from a user equipment unit (UE) finds the signaling network address of the RNC acting as the Serving RNC for the user equipment unit (UE) is understood with reference to U.S. patent application Ser. No. 09/258,151, filed Feb. 26, 1999, entitled "Method and Apparatus for Transferring Information Between Mobile Terminals and Entities In A Radio Access Network", which is incorporated herein by reference. Other possible ways to find the signaling network address of the serving RNC (SRNC) are also within the scope of the present invention.

Thus, in accordance with the present invention, each radio network controller (RNC) 24 need, on a permanent basis, only store RNC signaling network addresses, of (1) all other RNCs that have at least one cell in that URA; and (2) any RNCs which function as a serving RNC for a connection for which the RNC functions as a drift RNC (DRNC). This means that each radio network controller need not store addresses for all radio network controllers throughout the topology of the radio access network 20.

In addition, the present invention advantageously requires less operation and maintenance support to keep each RNC node updated with correct "URA Information" and RNC signaling network addresses. Further, paging of a mobile active in a specific URA can be initiated from the RNC (SRNC) knowing the location (URA) of the mobile in the network, regardless of which RNC that has cells within the URA. This paging can be performed even if some of the cells are controlled by other RNCs than the RNC receiving the last URA Update (the DRNC at the time of the URA Update).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A radio access network comprising:
   plural radio network controllers including a first radio network controller, the plural radio network controllers being situated to establish one or more overlapping routing areas, each overlapping routing area comprising a cell controlled by the first radio network controller and at least one cell controlled by another of the plural radio network controllers;
   wherein, in response to a routing area update procedure initiated by a user equipment unit, as criteria for which other radio network controllers to store addresses for signaling a routing area update request message, the first radio network controller need only store network addresses for:
      any of the plural radio network controllers which controls a cell in any overlapping routing area; and
      any of the plural radio network controllers which functions as a serving radio network controller for a connection for which the first radio network controller functions as a drift radio network controller.

2. A radio access network of claim 1, further comprising a signaling network connecting the plural radio network controllers, wherein one of the plural radio network controllers is a serving radio network controller which controls a connection between a core network and a user equipment unit, wherein when the user equipment unit moves from a first routing area to a second routing area, the second routing area being an overlapping routing area in which a second radio network controller also controls cells, the first radio network controller sends, in the routing area update request message to a serving radio network controller, both (1) an address of the first radio network controller, and (2) the address of the second radio network controller, thereby enabling the serving radio network controller to page the user equipment unit throughout the overlapping routing area.

3. The apparatus of claim 1, wherein the signaling of the routing area update request message is prompted by a user equipment unit initiating the routing area update procedure.

4. A radio network controller for a radio access telecommunications network, which stores network addresses, as criteria for which other radio network controllers to store address for use in signaling a routing area update request message generated in response to a routing area update procedure initiated by a user equipment unit, said radio network controller stores only network addresses of:
   those other radio network controllers which control cells in overlapping routing area(s), the overlapping routing area(s) also having at least one cell controlled by the radio network controller; and
   those other radio network controllers which function as a serving radio network controller for a connection for which the radio network controller functions as a drift radio network controller.

5. The apparatus of claim 4, wherein when the radio network controller serves as a drift radio network controller, and wherein when an user equipment unit moves from a first routing area to a second routing area, the second routing area being an overlapping routing area, the radio network controller sends, in the routing area update request message to a serving radio network controller, both (1) an address of the radio network controller, and (2) the address of any other radio network controller having cells in the overlapping routing area, thereby enabling the serving radio network controller to page the user equipment unit throughout the overlapping routing area.

6. The method of claim 4, wherein the signaling of the routing area update request message is prompted by a user equipment unit initiated the routing area update procedure.

7. A method of operating a radio access network comprising plural radio network controllers and having one or more overlapping routing areas, each overlapping routing area comprising a cell controlled by a first radio network controller and a cell controlled by another of the plural radio network controllers, the method comprising:

initiating a routing area update procedure by a user equipment unit in response to initiation of the routing area update procedure, requiring the first radio network controller, as criteria for which other radio network controllers to store addresses for signaling a routing area update request message, only storing network addresses for:

any of the plural radio network controllers which controls a cell in the one or more overlapping routing area;

any of the plural radio network controllers which functions as a serving radio network controller for a connection for which the first radio network controller functions as a drift radio network controller.

8. The method of claim 7, wherein one of the plural radio network controllers is a serving radio network controller which controls a connection between a core network and a user equipment unit, wherein when the user equipment unit moves from a first routing area to a second routing area, the second routing area being an overlapping routing area in which a second radio network controller also controls cells, the method further comprising:

the first radio network controller sending, in the routing area update request message to a serving radio network controller, both (1) an address of the first radio network controller, and (2) the address of the second radio network controller, thereby enabling the serving radio network controller to page the user equipment unit throughout the overlapping routing area.

9. The method of claim 7, wherein the sing of the routing area update request message is prompted by a user equipment unit initiating the routing area update procedure.

* * * * *